United States Patent

Packer et al.

[19]

[11] Patent Number: 6,131,138
[45] Date of Patent: Oct. 10, 2000

[54] VARIABLE SPEED COMPACT DISC DRIVE INCLUDING AN ELASTIC BUFFER

[75] Inventors: John S. Packer, San Jose; Steven D. Wilson, Fremont, both of Calif.

[73] Assignee: STMicroelectronics N.V., Netherlands

[21] Appl. No.: 08/917,792

[22] Filed: Aug. 18, 1997

[51] Int. Cl.[7] .................................................. G06F 12/02
[52] U.S. Cl. ........................... 711/4; 711/110; 711/117; 710/21; 710/25; 710/26; 710/45; 710/53; 710/60; 369/14; 369/15; 369/239; 84/645
[58] Field of Search .............................. 711/1, 117, 110; 369/14, 15, 239; 710/53, 21, 25, 26, 45, 60; 84/645

[56] References Cited

U.S. PATENT DOCUMENTS

| | | | |
|---|---|---|---|
| 4,028,666 | 6/1977 | Suzuki et al. | 710/60 |
| 4,607,345 | 8/1986 | Mehta | 710/60 |
| 4,994,925 | 2/1991 | Yamashita et al. | 358/343 |
| 4,996,679 | 2/1991 | Yoshio | 369/33 |
| 5,208,913 | 5/1993 | Yamamoto | 710/61 |
| 5,226,046 | 7/1993 | Hanson | 370/105.4 |
| 5,249,166 | 9/1993 | Hamilton et al. | 369/32 |
| 5,249,271 | 9/1993 | Hopkinson et al. | 710/57 |
| 5,397,853 | 3/1995 | Koguchi | 84/609 |
| 5,408,678 | 4/1995 | Kato et al. | 710/60 |
| 5,508,983 | 4/1996 | Nakamura et al. | 369/32 |
| 5,630,111 | 5/1997 | Yoshida | 713/600 |
| 5,818,801 | 10/1998 | Watanabe et al. | 369/33 |
| 5,915,128 | 6/1999 | Bauman et al. | 710/60 |

OTHER PUBLICATIONS

Denise G. Howe, "*Compact Disc Direct Access Storage Disc (CD–DASD)*", pp. 1–16, Rev. 1.1, Jan. 25, 1996, Optical Storage Data Center, Tucson, AZ.

Daniel Ewing, "*Clickable Imagemap of a CD Player*", Rev. ed., 1990, Time–Life Books, Alexandria, VA.

Unknown, "*Subcode on the Compact Disk*", pp. 1–3, 1990, Time–Life Books, Alexandria, VA.

Prof. Kelin J. Kuhn, "*Audio Compact Disk—Writing and Reading the Data*", EE 498, pp. 1–9, 1990, Time–Life Books, Alexandria, VA.

Prof. Kelin J. Kuhn, "*Audio Compact Disk—An Introduction*", EE 498, pp. 1–8, 1990, Time–Life Books, Alexandria, VA.

*Primary Examiner*—Hiep T. Nguyen
*Attorney, Agent, or Firm*—Theodore E. Galanthay; Lisa K. Jorgenson; Steven H. Slater

[57] ABSTRACT

The present invention provides an improved disc drive. In one embodiment of the present invention a disc drive capable of spinning a disc, which contains more than one type of data is disclosed. A first type of data is associated with a first speed, and a second type of data is associated with a second speed that is faster than the first speed. The disc drive includes a drive mechanism, which may spin the compact disc at the first and second speeds and retrieve data from the compact disc at either speed. The disc drive also includes an elastic buffer, which is in communication with the drive mechanism. The buffer receives data from the drive mechanism at a variable input data rate and outputs data at a variable output data rate. Whereby when the drive mechanism spins the compact disc at the second speed the buffer may receive the first type of data without causing the drive mechanism to slow down to the first speed, and the buffer may output the first type of data at the variable output data rate. Preferably, the variable output data rate is a first data rate that is associated with the first format.

41 Claims, 6 Drawing Sheets

VARIABLE SPEED COMPACT DISC DRIVE INCLUDING AN ELASTIC BUFFER

BACKGROUND OF THE INVENTION

1. Field of the Invention

This invention relates generally to disc players, and more particularly to methods and apparatus for efficiently retrieving different types of information from a disc memory medium.

2. Description of the Related Art

Optical discs have become an integral part of computer systems due to their ability to store large quantities and types of data on a single medium. For example, compact discs (CD) are capable of holding over 630 megabytes of data. The types of data can range from computer CD read only memory (ROM) data, photoCD, CD-i, DVD, laser disc, CD-audio to various video formats, as well as the myriad of other data formats, as known in the art. The different types of CD data are sometimes speed specific, i.e., the CD must be spinning at a fixed speed in order to properly process the CD data.

FIG. 1 is a block diagram of a typical CD drive 10 used in a computer system. The CD drive normally includes a CD drive assembly 11, digital signal processor (DSP) 14, a microprocessor 20, a CD drive controller 28, a digital to analog converter 111, and an amplifier 112.

The CD drive assembly 11 is typically a mechanism through which a CD 13 is spun in order to retrieve data from the CD. The CD drive assembly generally includes a servo/motor assembly 12 that does the actual spinning of CD 13. CD drive assembly 11 also includes transducers (not shown) that enable it to read and/or write data to and from the CD. When the CD assembly retrieves information from CD 13, CD drive assembly 11 passes the information on to DSP 14.

DSP 14 processes the information retrieved from the CD drive assembly 11. Typically, DSP 14 performs error correction code decoding on the information retrieved from CD 13, among various other functions. The information can be temporarily stored in a DSP buffer 16 while undergoing processing. The processed data is then sent to either the CD drive controller 28 to be passed on to a central processing unit 40 of the computer system, or to D/A 111 for amplification by amplifier 112 and eventual output to a speaker 113. Typically, before DSP 14 routes the retrieved information to D/A 111, DSP 14 performs additional processing steps in order to enable D/A 111 to properly receive information.

In addition to performing the initial processing of the CD data, DSP 14 can also control the servo/motor assembly of the CD drive assembly. The DSP typically includes a servo/motor controller 17 that manages the operation of servo/motor assembly 12.

Microprocessor 20, in turn, controls the functions of the DSP, as well as other parts of CD drive 10. Microprocessor 20 operates in conjunction with appropriate memories 22 and 24. Typically, one memory is a read only memory 22 and the other is a random access memory 24. The read only memory 22 normally includes instructions for the operation of the microprocessor. Microprocessor 20 typically receives an instruction from a CPU 40 to retrieve information from CD 13. The instruction can indicate what piece of information is needed, and where the information should be routed to.

FIG. 2 is a block diagram of CD drive controller 28. If the information retrieved from CD 13 is data which is to be routed to the CPU, DSP 14 passes the requested information to CD drive controller 28. CD drive controller 28 includes a disc interface 30, a buffer manager 32 and host interface 34. The disc interface 30 receives the CD information from DSP 14 and passes it along to the buffer manager 32. The buffer manager 32 typically buffers the information in a memory buffer 36 for reformatting the information so that the information can be sent to CPU 40 through host interface 34. Typically, information routed to CPU 40 can include any of the various types of data formats that may be included on CD 13.

CPU 40, or the microprocessor 20 independently, can route the information retrieved from CD 40 to D/A 111. Generally, information routed to D/A 111 is only the CD-audio type of data, since that particular type of information is formatted for immediate output to a speaker 113.

Upon receiving a request for information that is speed dependent, microprocessor 20 typically instructs DSP 14 to adjust the speed of the servo/motor assembly to a speed associated with the speed dependent format. For CD-audio data the speed is normally at a constant linear velocity such that the data is read at the audio sample rate of 44.1 kHz per sample, a sample consisting of two sixteen bit values, commonly referred to as 1× speed. Most CD-drives today operate at speeds much greater than the 1× speed required for reading CD-audio data. For example, CD-drives can operate at 24× speed (i.e., twenty times the speed of 1×), and typically are not slower than 4× speed. Normally the highest speed is the most optimal and is the normal operating speed.

In prior art CD drives, DSP 14 typically directs the servo/motor assembly to slow down the spin of CD 13 from the normal operating speed if the requested information is in a speed specific data format slower than the normal operating speed. Typically, after the retrieval of the information, the servo/motor assembly 12 is typically required to speed back up to the normal operating speed.

CD drives can operate at such high speeds because most types of data can be read at high speed and routed to the CPU at similarly high speeds. Unfortunately, when the data is in the CD-audio format and is required to be output to speaker 113, the servo/motor assembly must reduce its speed back to 1× speed. Typically, this is due to the fact that if the CD-audio information were to be sent at a data rate associated with a speed greater than 1× speed to D/A 111 and correspondingly to speaker 113, via D/A 111 and amplifier 112, the output of the speaker would be discordant. For example, CD-audio data typically contains data sampled at a 44.1 kHz rate. Consequently, if the CD-audio data is played back at a higher rate than 44.1 kHz, the audio output will be too high in pitch or even sound unpleasant to a listener.

FIG. 3 is a flow chart of the operation of the CD drive depicted in FIG. 1, typically implemented by microprocessor 20. CD drive 10 typically operates at a normal speed in step 51, some multiple of 1×, until it is requested to retrieve CD-audio type information from CD 13 for output to speaker 113. In step 53, the speed of the servo/motor assembly 12 is slowed down to 1× speed in order to read the CD-audio data at the appropriate speed. The CD drive controller 28 is normally also configured by microprocessor 20 to handle receipt of the CD-audio information, and pass it along to CPU 40 if desired in step 55. Microprocessor 20 further configures DSP 14, in step 57, to route the CD-audio data to D/A 111 for output to speaker 113.

The need to slow down the speed of servo/motor assembly 12 creates a great number of inefficiencies. First, and foremost, the slowing down and subsequent speeding up of the servo/motor assembly to read speed dependent data increases the access time to retrieve information from a disc. The repetitive change in speeds also detrimentally effects the lifetime and long term reliability of the servo/motor assembly due to the increased stress applied on servo/motor assembly 12 during speed changes. Finally, with future increases in disc drive speeds past 24×, providing the ability to operate at such drastically different speeds will require additional costs and complexity in the disc drives. Thus, what is desired is an improved method and apparatus for retrieving speed dependent information from a disc without having to constantly slow down and speed back up.

SUMMARY OF THE INVENTION

The present invention provides an improved disc drive. In one embodiment of the present invention a disc drive capable of spinning a disc that contains more than one type of data is disclosed. A first type of data is associated with a first speed, and a second type of data is associated with a second speed that is faster than the first speed. The disc drive includes a drive mechanism which can spin the compact disc at the first and second speeds and retrieve data from the compact disc at either speed. The disc drive also includes an elastic buffer which is in communication with the drive mechanism. The buffer receives data from the drive mechanism at a variable input data rate and outputs data at a variable output data rate. Whereby when the drive mechanism spins the compact disc at the second speed the buffer can receive the first type of data without causing the drive mechanism to slow down to the first speed, and the buffer can output the first type of data at the variable output data rate. Preferably, the variable output data rate is a first data rate that is associated with the first format.

In another embodiment of the present invention, the elastic buffer includes a memory buffer and a disc drive controller. The disc drive controller is in communication with the drive mechanism and the memory buffer. The disc drive controller receives the first type of data from the drive mechanism at the variable input data rate while the compact disc is spinning at the second speed. The disc drive controller stores the first type of data in the memory buffer such that the compact disc drive controller can read out the first type of data from the memory buffer at the variable output data rate. Again, the variable output data rate is preferably at a data rate associated with the first type of data.

In yet another embodiment of the present invention, the elastic buffer includes a ping and a pong memory buffers. The ping and pong memory buffers receive the first type of data from the memory buffer by way of the buffer manager. The first type of data is loaded into the ping and pong memory buffers a word at a time. The ping memory buffer outputs a first word of the first type of data while the pong memory buffer receives a second word of the first type of data. The pong memory buffer outputs the second word of the first type of data while the ping memory buffer receives a third word of the first type of data, and repeats until all of the first type of data has passed through the ping and pong memory buffers.

In yet another embodiment of the present invention, the elastic buffer includes a high byte and a low byte memory buffers. The high byte and low byte memory buffers receive the first type of data from the ping and pong buffers a byte at a time. The high byte memory buffer outputs a high byte of the first word of the first type of data while the low byte memory buffer receives a low byte of a second word of the first type of data. Then the low byte memory-buffer outputs the low byte of the second word while the high byte memory buffer receives a high byte of the second word, and repeats until the first plurality of data has passed through the high byte and low byte memory buffers.

Therefore, the present invention advantageously provides an improved disc drive that is capable of reading different types of data from a disc, even speed dependent data, without having to slow down from an optimal operating speed. These and other advantages of the present invention will become apparent to those skilled in the art upon a study of the specification and drawings describing the present invention.

BRIEF DESCRIPTION OF THE DRAWINGS

The invention, together with further aspects and advantages thereof, may best be understood by reference to the following description taken in conjunction with the accompanying drawings in which:

FIG. 5 is a block diagram of the CD drive controller and a buffer memory of FIG. 4a;

DETAILED DESCRIPTION OF THE PREFERRED EMBODIMENTS

The present invention will now be described in detail with reference to exemplary preferred embodiments as illustrated in the accompanying drawings. In the following description, numerous specific details are set forth in order to provide a thorough understanding of the present invention. It will be apparent, however, to one skilled in the art, that the present invention can be practiced without some or all of these specific details. In other instances, well known process steps have not been described in detail in order to not unnecessarily obscure the present invention.

The present invention contemplates reading different types of data from a disc without having to change the speed at which the drive rotates. By buffering the data read from the disc at a faster rate, the buffered data can be output at the appropriate speed (e.g., 1× audio). Several layers of buffering can be utilized to achieve the purpose of the present invention.

In one embodiment, by allowing the drive to consistently operate at the most optimal speed, typically the fastest speed, access times to the disc can be optimized. Additionally, the amount of wear and tear on the servo/motor mechanism can be greatly reduced by removing the need to constantly slow down and speed up the rotation of the disc. In a further embodiment, a drive in accordance with the present invention need not be able to operate at the lower, less efficient speeds, thus reducing the costs and complexity of the drive.

The following is a detailed description of exemplary embodiments of the present invention. The illustrated embodiments focus on compact disc (CD) drives and CD-audio as the type of speed dependent data typically encountered. However, the present invention may be applicable to all types of disc drives and all forms of speed dependent data that may be found in various types of disc memory mediums.

Figure 1:
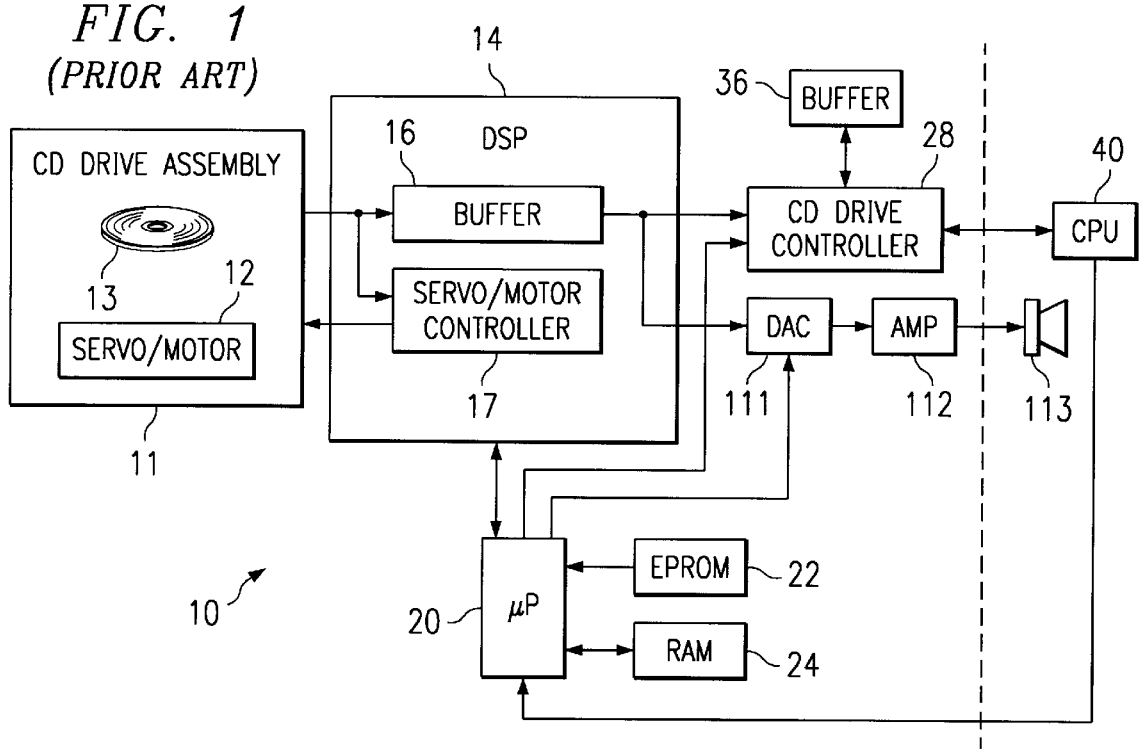
FIG. 1 is a block diagram of a typical CD drive used in a computer system.
Figure 2:
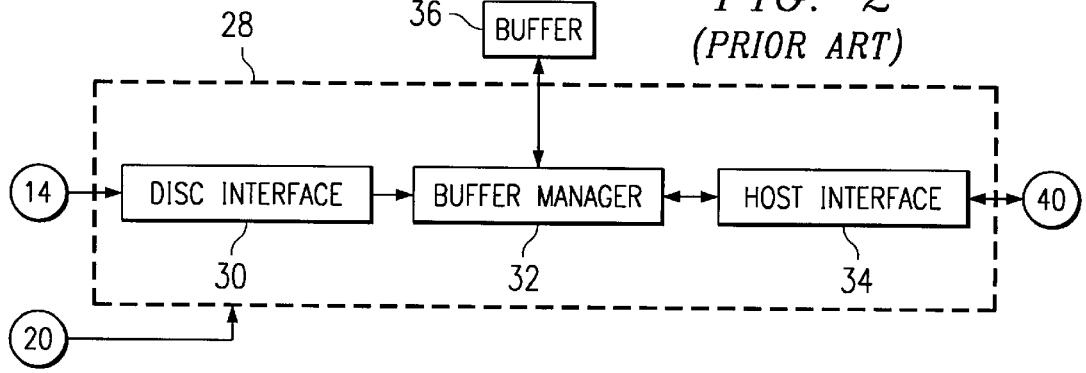
FIG. 2 is a block diagram of a CD drive controller of the CD drive of FIG. 1.
Figure 3:
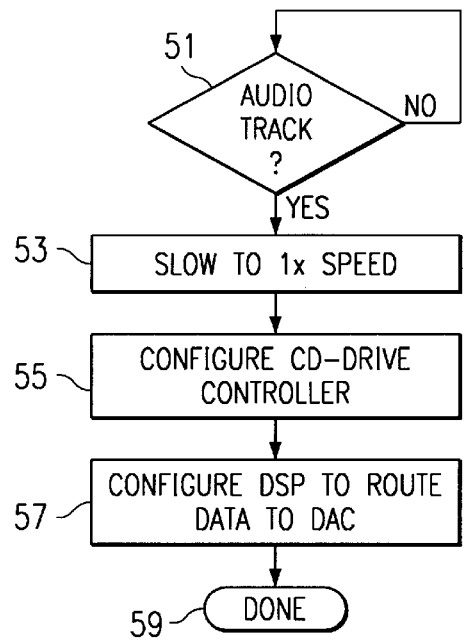
FIG. 3 is a flow chart of the operation of the CD drive depicted in FIG. 1, typically implemented by a microprocessor.
Figure 4A:
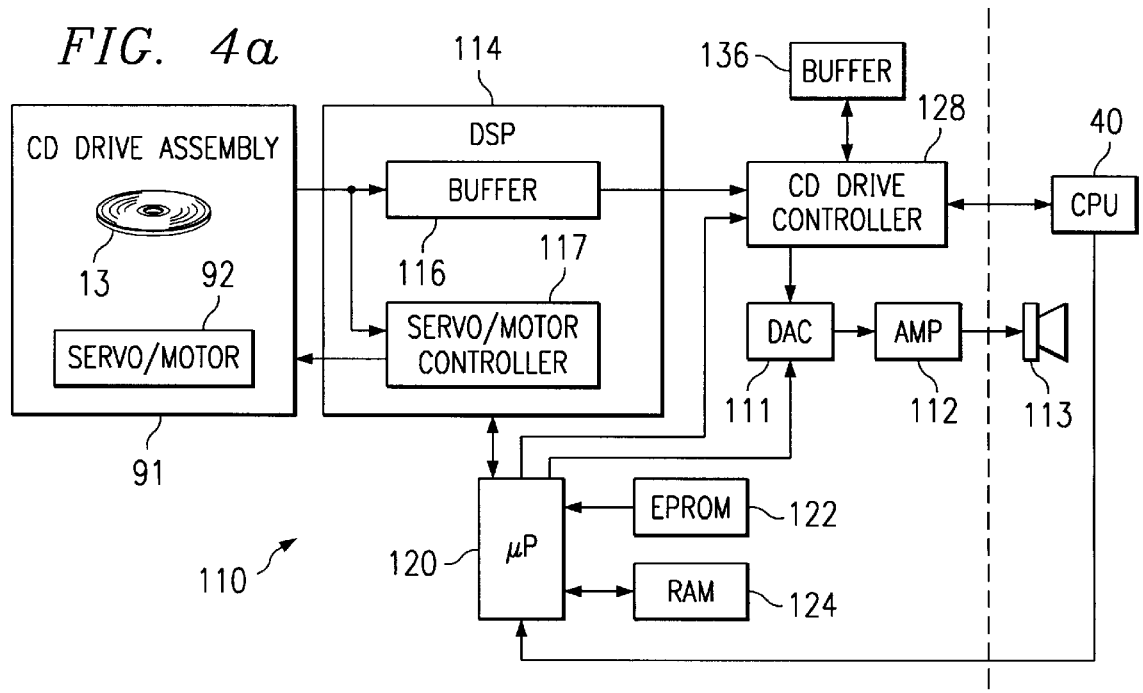
FIG. 4a is a block diagram of a CD drive in accordance with the present invention.

FIG. 4a is a block diagram of a CD drive 110 in accordance with the present invention. CD drive 110 typically includes a CD drive assembly 91, a DSP 114, a microprocessor 120, a CD drive controller 128, buffer memory 146, a D/A 111 and an amplifier 112. The CD drive is normally in communication with a central processing unit (CPU) 40. CPU 40 typically provides instructions to microprocessor 120 and CD drive controller 128 to retrieve information from a CD 13 spinning within CD drive assembly 91.

As discussed, CD 13 can contain information in different types of CD data formats. By way of examples, CD read only memory (ROM) data, photoCD, CD-audio, CD-i, laser disc and various video formats and data in other types of suitable CD data formats may be contained on the CD 13.

CD drive assembly includes a servo/motor assembly 92 that actually spins CD 13. CD drive assembly 91 is typically capable of spinning CD 13 at any appropriate speed in order to read the data contained on the CD. Normally, the slowest speed suitable for reading data from a CD is typically referred to as 1x speed. Thus, CD drive assembly 91 can spin CD 13 from 1x to any multiple thereof, only limited by the physical hardware used to read the data from the CD. Currently, CD drive assemblies are capable of spinning a CD at 24x speed or higher, however the present invention is not limited to the speeds of current CD drive assemblies. It should therefore be appreciated that the present invention is readily applicable to a CD drive assembly operating at almost any speed.

Microprocessor 120 is typically in communication with CPU 40. Microprocessor typically operates in conjunction with memories 122 and 124. Memory 122 can be a read only memory used for holding the operating instructions of the microprocessor. And, memory 124 can be random access memory used by the microprocessor during operation. When an instruction is received from CPU 40 requesting information from CD 13, microprocessor 120 controls the elements of CD drive 110 in order to retrieve the information.

DSP 114 includes a DSP buffer 116 and a servo/motor controller 117. Buffer 116 of DSP 114 receives the data retrieved from CD 13 by CD drive assembly 91. In turn, DSP 114 also controls the spin rate of servo/motor assembly 92 through servo/motor controller 117. Microprocessor 120, typically directs DSP 114 to a certain piece of information requested from CD 13. Instead of slowing down the rotation of CD 13, DSP 14 retrieves the requested information from CD 13 independent of whether the information is speed dependent or not, at the current speed.

Normally the servo/motor assembly spins CD 13 at a normal operating speed. In one embodiment, the normal operating speed is the fastest speed capable by CD drive assembly 91. However, CD 13 may be spinning at any speed. The requested information is read at that speed rather than the speed normally dictated by the format of the information.

In one embodiment, CD 13 can be spinning at 24x and the requested information may be CD-audio that is played back at a 1x speed. Specifically, the CD-audio data may be read from the CD at the 24x speed rather than the 1x speed. DSP 114 receives the requested information from CD drive assembly 91 and processes the information so it can be passed along to CD drive controller 128. By way of example, the processing steps performed by DSP 114 can include, error correction code decoding, de-interleaving, data/clock separation, demodulation, data/sub-code extraction, error interpolation and other suitable types of DSP functions as known in the art. The information is typically stored and processed in DSP buffer 116.

From DSP buffer 116, the information is passed to CD drive controller 128. Microprocessor 120 will have already configured CD drive controller 128 to handle the requested information in the appropriate manner. If the requested information is in a speed dependent format, in the illustrated embodiment CD-audio information, that is to be routed to speaker 113, CD drive controller 128 is configured to route the information to D/A 111 rather than to CPU 40.

As can be appreciated in the illustrated embodiment, CD-audio required to be played directly to speaker 113 is not routed straight from DSP 114 to D/A 111. Instead, the CD-audio information passes through CD drive controller 128 for buffering, such that the output of the CD-audio information can play at a rate associated with the CD-audio format even though the requested information is being received by CD drive controller 128 at a rate associated with a higher speed spin rate.

Figure 4B:
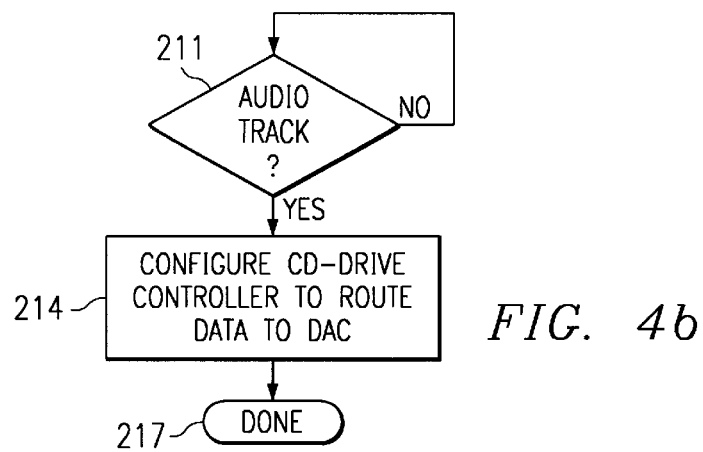
FIG. 4b is a flow chart of the operation of a microprocessor of the CD drive of FIG. 4a, in accordance with the illustrated embodiment of the present invention.

FIG. 4b is a flow chart of a sub-routine of the operation of microprocessor 120 in accordance with the illustrated embodiment of the present invention. In step 211, CD drive 110 is spinning at a high speed rate, reading and processing non-speed specific information from CD 13. When CD drive 110 is requested to retrieve speed dependent information from CD 13, or encounters speed dependent information as part of a larger piece of information that it is retrieving, the microprocessor begins to inform the rest of the CD drive to prepare for handling the speed dependent information. In the illustrated embodiment, the speed dependent information is CD-audio information that is to be played directly to speaker 113. Again, the present invention is not limited to CD-audio, but applies to any type of speed dependent data format.

In step 214, microprocessor 120 configures CD drive controller 128 to route the speed dependent information in the appropriate manner. In another embodiment, CD drive controller 128 is instructed to receive the information at a rate that is associated with the high spin speed, but to output the information at a speed associated with CD-audio to D/A 111. As can be appreciated, there is no instruction to slow down the speed of the servo/motor assembly. The microprocessor then proceeds to step 217, which defines the end of the sub-routine.

Figure 5:
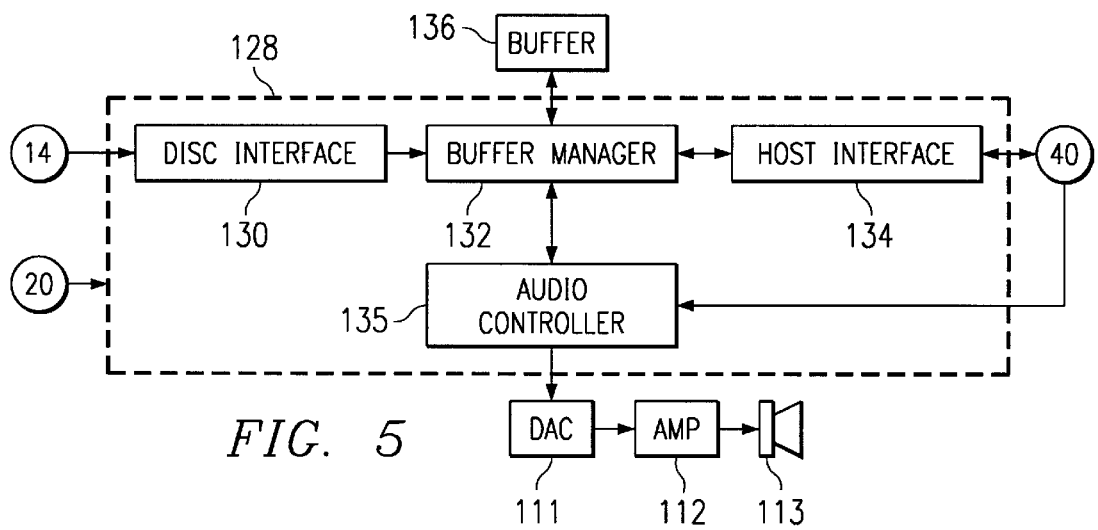

FIG. 5 is a block diagram of CD drive controller 128 and buffer memory 136 of FIG. 4a. CD drive controller 128 includes disc interface 130, buffer manager 132 and host interface 134. Disc interface 130 and host interface 134 handle communications between CD drive controller 128 and the DSP 114 and the CPU 40, respectively. Buffer manager 132 orchestrates the transfer of information received from CD 13 to the various different outputs.

In one embodiment, outputs typically include output to CPU 40 and output to speaker 113. However, any suitable output that may or may not be speed dependent can be handled by a drive in accordance with the present invention. By way of example, video outputs, radio-frequency outputs, control signal outputs, outputs to peripherals, and other suitable types of outputs can be derived from the information retrieved from a disc.

In addition to disc and host interfaces 130 and 134 and buffer manager 132, CD drive controller 128 of the illustrated embodiment may further include an audio controller 135. Audio controller 135 manages the flow of information from the buffer manager to D/A 111, as discussed further herein.

Figure 6:
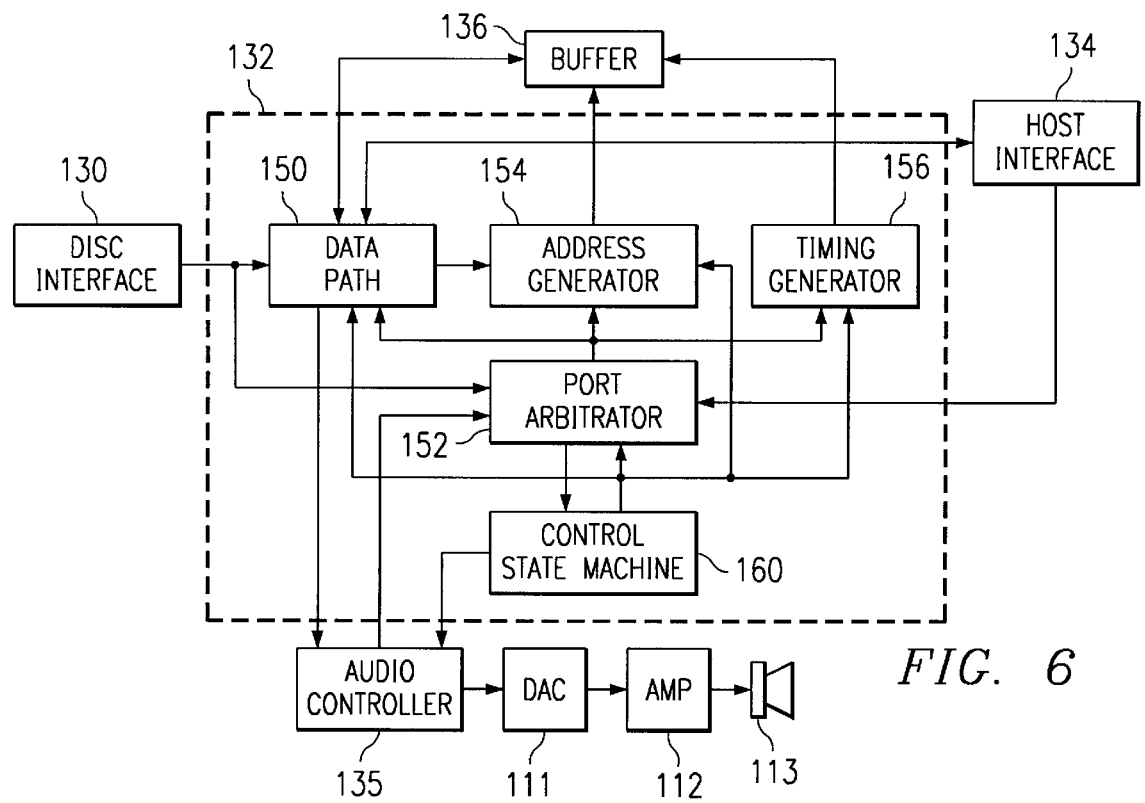
FIG. 6 is a block diagram of the buffer manager of FIG. 5.

FIG. 6 is a block diagram of the buffer manager 132 of FIG. 5. Buffer manager 132 typically includes a data path controller 150, address generator 154, timing generator 156, port arbitrator 152 and a control state machine 160. Control state machine 160 generally provides timing signals which controls the other elements of the buffer manager 132 (e.g., 150, 152, 154 and 156).

Data path 150 controls the path of information moving to and from the buffer memory 136. Data can be transferred from disc interface 130 to buffer memory 136 through data path 150, and then from buffer memory 136 to either audio controller 135 or host interface 134. Address generator 154 and timing generator 156 generate the appropriate timing and address signals to buffer memory 136 during insertion or retrieval of information from the buffer memory 136.

Port arbitrator 152 coordinates access to buffer memory 136. Port arbitrator 152 is in communication with disc interface 130, host interface 134 and audio controller 135. Typically, disc interface 130 will signal to port arbitrator 152 that information from CD 13 is waiting to be sent to buffer manager 136. Port arbitrator 152 normally configures data path 150 to route the incoming information to buffer manger 136, while also instructing the address and timing generators 154 and 156 to provide the appropriate signals for the proper insertion of the information into buffer memory 136.

The information held in buffer memory 136 is normally destined for either host interface 134 to be passed on to CPU 40, or audio controller 135 and eventually to speaker 113. Host interface 134 informs port arbitrator 152 that the CPU is waiting for the information in buffer memory 136. Port arbitrator 152 adjusts data path 150, address generator 154 and timing generator 156 for transferring the information from buffer manager 136 to host interface 134 or audio controller 135.

The transfer of data from buffer memory 136 to host interface 134 and CPU 40 is known in the art. The rate at which the information is transferred to host interface 134 and CPU 40 is typically at a rate associated with the bus connecting the host interface and CPU 40. That rate may or may not be equivalent to the rate at which the information was read from CD 13, which is associated with the spin rate. However, the CPU bus is typically capable of handling data at rates greater the CD access rate, and data passed to the CPU 40 does not normally need slowing down in order for the information to be successfully passed from CD 13 to CPU 40.

In prior art CD drive systems, the output rate of CD-audio data from a DSP is typically dependent upon the spin/access rate of the CD. In the present invention, the rate at which CD-audio data is transferred from buffer memory 136 and eventually to speaker 113 is independent of the spin/access rate of CD 13. First, buffer manager 132 is configured to use buffer memory 136 to hold the CD-audio information such that it can be parsed out at the appropriate output rate. Typically, buffer memory 136 is merely used as cache memory which requires a small amount of memory. In prior art systems, cache memory is typically about 256 kilobytes.

Since the present invention contemplates drastically different spin/access and output rates, the amount of information to be buffered can be much greater than typical cache sized memory. By way of example, if the spin speed is at 24×, the access rate is retrieving information 24 times faster than if the spin speed was at 1×. For CD-audio 1× spin speed corresponds to retrieving 176.4 kilobytes per second from CD 13, and outputting 176.4 kilobytes per second to D/A 111. At 24× spin speed CD drive 110 is retrieving 4.2336 megabytes per second from CD 13 but still outputting at 176.4 kilobytes per second to the D/A 111. Thus, if the CD-audio information is a large piece of data the buffer memory may be required to hold up to a maximum of $^{23}\!/_{24}$th of the information. Due to the increasing availability of memory, this can be achieved by providing more memory in buffer memory 136.

In another embodiment of the present invention, buffer memory 136 need not be increased drastically in size. The CD-audio information can be read at the illustrated 24× rate in portions rather than as a continuous piece of information. Enough CD-audio data can be read from CD 13 at the 24× until buffer memory 136 is filled. After the data in the buffer memory has been parsed out to the D/A at the appropriate 1× associated output rate, the next portion of the CD-audio information can be loaded into buffer memory 136. In this manner, current buffer memory sizes can be utilized to buffer the CD-audio information. Thus, buffer memory 136 provides a first layer of buffering for transitioning the CD-audio information from the spin/access rate to the output rate.

Figure 7:
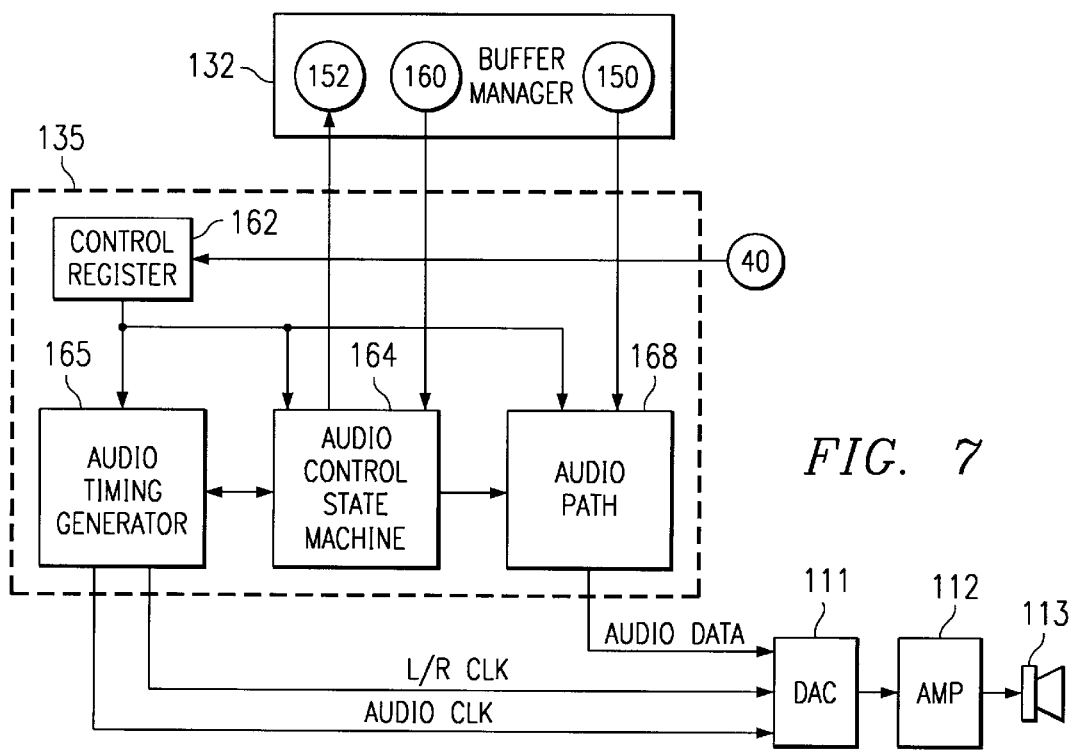
FIG. 7 is a block diagram of the audio controller of FIG. 6.

FIG. 7 is a block diagram of audio controller 135 of FIG. 6. Audio controller 135 includes control register 162, audio timing generator 165, audio control state machine 164 and audio path 168. Control register 162 receives an instruction from CPU 40 that enables audio controller 135 to output the CD-audio information. Control register 162 in turn enables audio timing generator 165, audio control state machine 164 and audio path 168.

Audio timing generator 165 provides an audio data clock and a left/right clock associated with the output of the CD-audio information to the D/A. The audio data clock is used by the D/A to clock in the audio data from the audio path. The left/right clock is used to indicate to the D/A whether the left channel or right channel of the audio data is being output from the audio path.

Audio path 168 receives the CD-audio from buffer memory 136 through data path 150 of buffer manager 132. Audio path 168 further buffers the CD-audio information in order to ensure that the CD-audio is played without errors, and provides proper synchronization after any interruptions during playback.

Audio control state machine 164 provides timing and control signals to the audio timing generator and the audio path. Audio control state machine 164 submits requests for CD-audio data to port arbitrator 152 of buffer manager 132. The audio control state machine 164 typically receives an acknowledge signal from the control state machine 160 of buffer manager 132 when CD-data is ready to be transferred from memory buffer 136 to audio controller 135.

Figure 8:
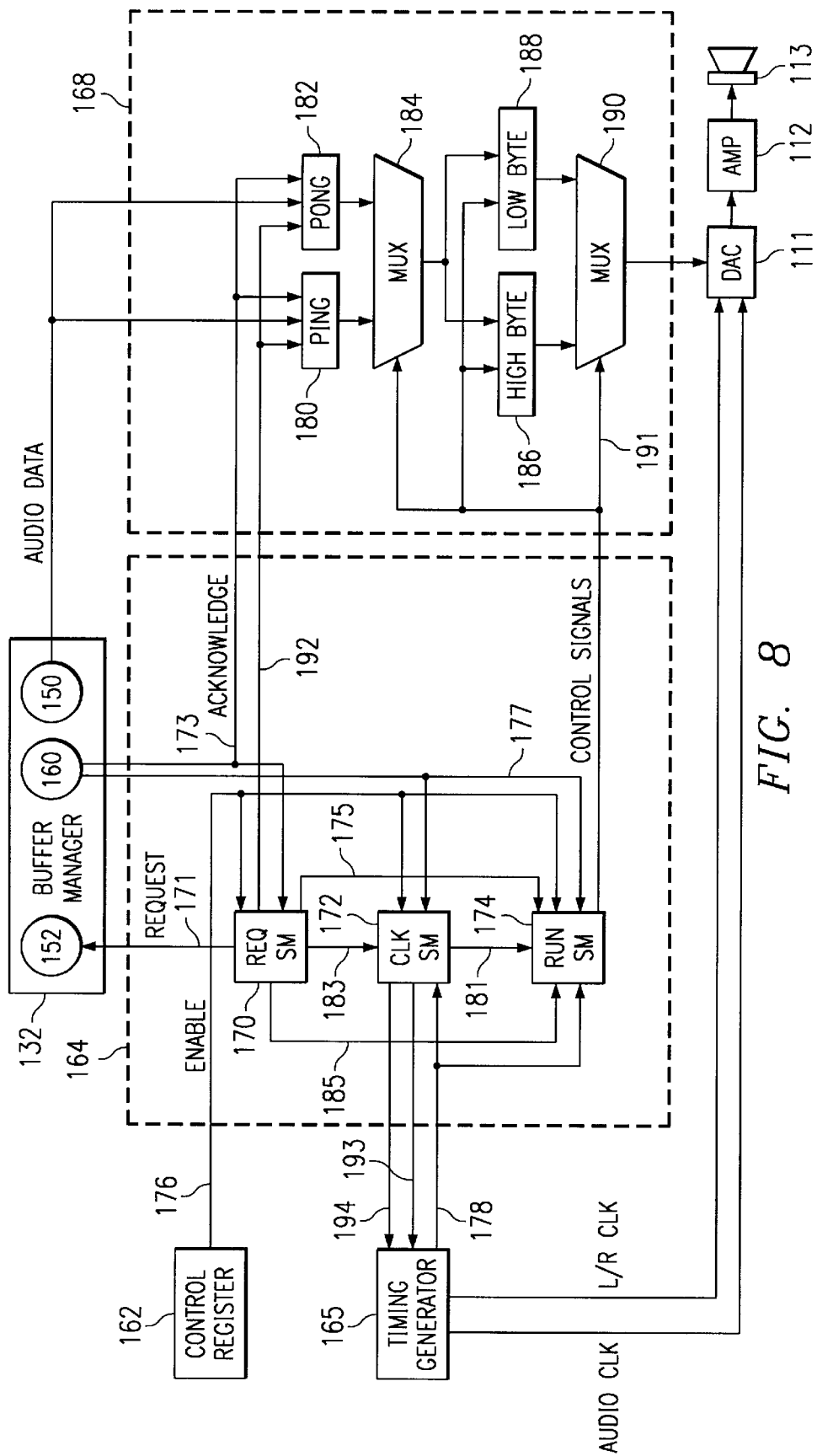
FIG. 8 is a block diagram of the audio control state machine and the audio path of FIG. 7.

FIG. 8 is a block diagram of audio control state machine 164 and audio path 168 of FIG. 7. FIG. 8, is best understood in conjunction with the state diagrams of FIGS. 9, 10 and 11.

Audio control state machine 164 includes a request state machine 170, clock state machine 172 and run state machine 174. Audio path 168 includes ping and pong registers 180 and 182, a first multiplexer 184, high and low byte registers 186 and 188 and a second multiplexer 190.

Initially the request state machine 170 waits for an enable signal 176 from the control register 162. The request state machine 170 then generates a request signal 171 at the start up of the output of CD-audio data in order to request the information from buffer manager 132. Audio control state machine 164 waits until the receipt of an acknowledge signal 173 from control state machine 160 of buffer manager 132. Acknowledge signal 173 is sent to the request state machine and the ping and pong registers 180 and 182. Request state machine 170 then sends a load signal 192 to the ping and pong registers 180 and 182. The load signal 192 loads ping and pong registers 180 and 182 with the CD-audio data from buffer manager 132.

Figure 9:
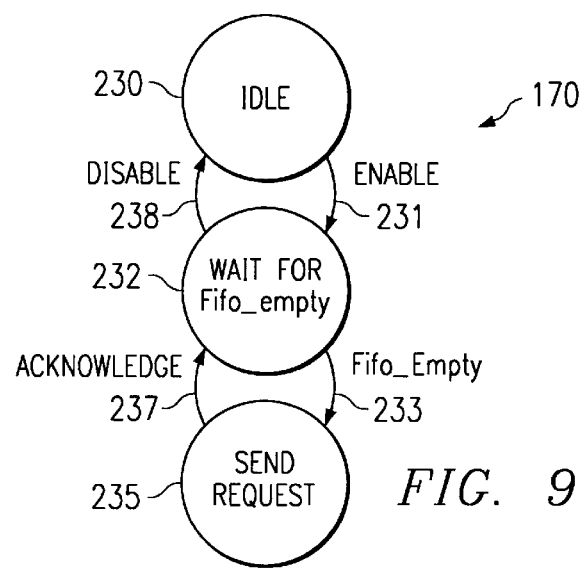
FIG. 9 is a state diagram of the operation of the request state machine of FIG. 8.

FIG. 9 is a state diagram of the operation of request state machine 170 of FIG. 8. In state 230, the request state machine is in an idle state until it receives enable signal 176 from control register 162. The request state machine 170 transitions 231 to state 232. In state 232, request state machine 170 waits until a fifo-empty signal is received 233. The fifo_empty signal is an internal signal within request state machine 170. Typically, the fifo_empty signal is generated within request state machine 170 when request state machine 170 is initially started up, or when one or both of the ping and pong registers 180 and 182 are empty. The ping or pong registers 180 and 182 will be empty after their contents have been successfully loaded into high and low byte registers 186 and 188, as discussed further. Receipt of the fifo_empty signal 233 triggers the request state machine 170 to send a request to buffer manager 132 in state 235.

When an acknowledge signal 173 is received, as shown in transition 237, the request state machine 170 loads ping and/or pong registers 180 and 182 and transitions back to wait for fifo_empty state 232, and waits until the next fifo_empty condition occurs. Request state machine 170 also generates control signals 183 and 185 to clock state machine 172 and run state machine 174, respectively, during transition 237, as will be discussed in greater detail below. Request state machine 170 returns to idle state 230 when it is disabled in transition 238. Request state machine 170 can be disabled 238 by the removal of enable signal 176 from the control register 162, or upon receipt of a separate disable signal.

Figure 10:
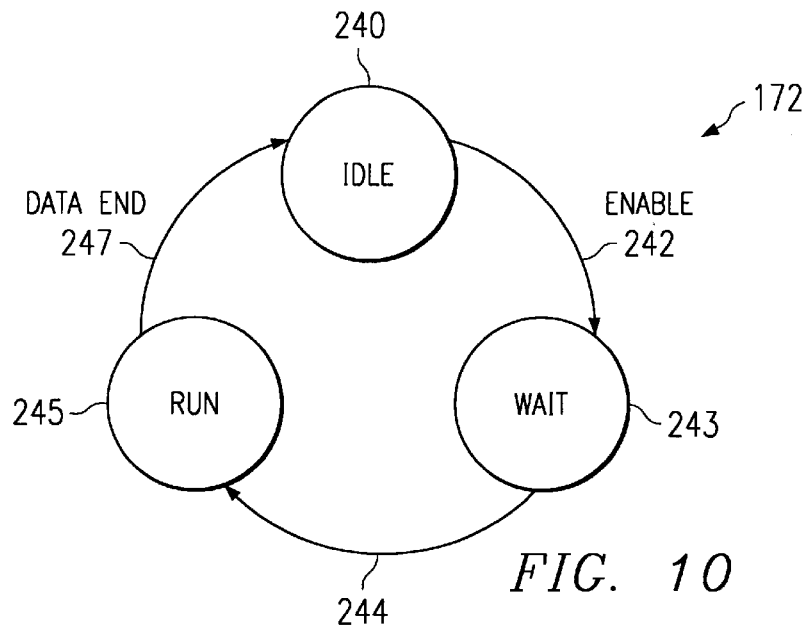
FIG. 10 is a state diagram of the operation of the clock state machine of FIG. 8.

FIG. 10 is a state diagram of the operation of clock state machine 172 of FIG. 8. Clock state machine 172, in reset state 240, waits to receive enable signal 176 from control register 162. Upon receiving enable signal 176, clock state machine 172 undergoes a transition 242 to wait state 243.

Clock state machine 172 receives a word count 178 from timing generator 165. Word count 178 is generated from a free running counter clocking off the audio. Word count 178 indicates the complete clocking out of a word, i.e., word count 178 counts from however many bits are contained in a word down to zero. The number of bits may vary since the length of a CD-audio word, or any type of speed dependent data word, may vary. CD-audio words typically contain 24 or 16 bits. When synchronized, word count 178 is zero at the transition of the L/R clock.

Clock state machine 172 remains in wait state 243 until it receives the appropriate word count 178. When clock state machine 172 receives a zero word count 178 it undergoes a transition 244 to run state 245. In run state 245, clock state machine 172 propagates the audio and left/right clocks of the timing generator out to D/A 111. Synchronization with word count 178 allows clock state machine 172 to cleanly start up timing generator 165. In another embodiment, word count 178 may be generated from a word counter separate from timing generator 165.

Clock state machine 172 remains in run state 245 until it is disabled. Clock state machine 172 will be disabled in several situations. First, if enable signal 176 from control register 162 is deactivated, then clock state machine 172 will undergo a transition 247 back to reset state 240.

Second, if run state machine 174 ceases to run in a run state 257, as will be described further below, and word count 178 reaches zero, clock state machine 172 will transition 247 to reset state 240. Clock state machine also generates a data end signal 181 during transition 247. Waiting for word count 178 to reach zero allows all the pending data to clock out completely.

Similarly, when clock state machine 172 receives a last frame signal 177 from control state machine 160 of buffer manager 132, the clock state machine prepares to stop propagating data. The last frame signal 177 indicates that the last portion of the CD-audio is being received from buffer memory 136. Using word count signal 178 and the last frame signal 177, the clock state machine can end propagation at the appropriate time, i.e., at the end of the last word of data. Again, clock state machine generates a data end signal 181 to run state machine during transition 247.

Figure 11:
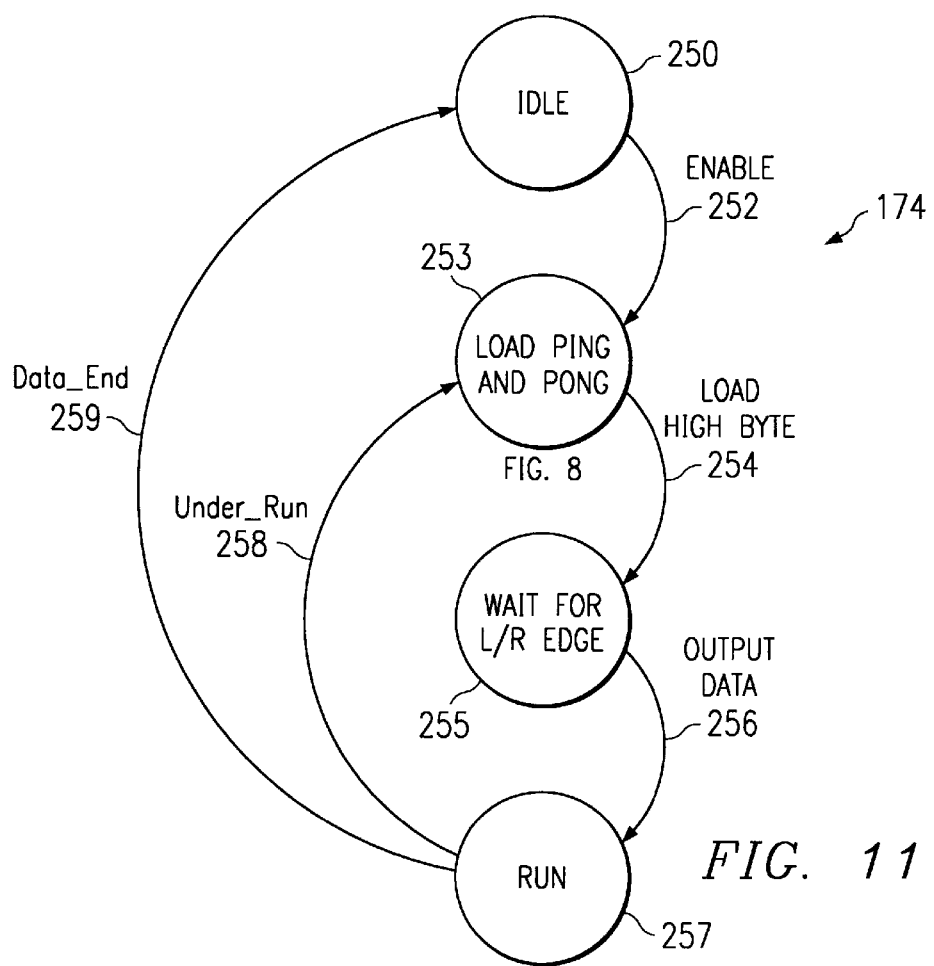
FIG. 11 is a state diagram of the operation of the run state machine of FIG. 8.

FIG. 11 is a state diagram of the operation of run state machine 174 of FIG. 8. Run state machine 174 provides control signals 191 to the various parts of the audio path 168 to control the output of CD-audio data. Initially, run state machine 174 is in state 250 waiting for enable signal 176 and control signal 185 from the request state machine 250. Once the enable and control signals have been received, run state machine 174 transitions 252 to state 253 and waits for request state machine 170 to load ping and pong registers 180 and 182.

After ping and pong registers 180 and 182 are loaded with CD-audio data by request state machine 170, run state machine 174 additionally sets multiplexer 184 to allow one of the ping or pong registers holding the first word of CD-audio data to communicate with high and low byte registers 186 and 188 in state 253. By way of example, ping register 180 can be loaded with the first word of CD-audio data and pong register 182 is loaded with the next word of CD-audio data. Initially, multiplexer 184 will allow ping register 180 to transfer data to the high or low byte registers 186 or 188 because it has the first word of CD-audio data.

Run state machine 174 loads high byte register 186 with the most significant byte of the first word of CD-audio data in transition state 254. In state 255 run clock machine 174 waits for the correct edge of the left/right clock generated by the timing generator before further outputting data based upon the word count 178. Waiting for the correct left/right edge of the left/right clock synchronizes the data output with the audio and left/right clocks and also synchronizes the data output with any previous output that might have been interrupted, as discussed further.

In transition 256, run state machine 174 provides the appropriate signals to start the output of data. In state 257, run state machine 174 continues to operate high and low byte registers 186 and 188 and multiplexers 184 and 190 to output the CD-audio data. As discussed, ping and pong registers 180 and 182 are loaded with the first words of CD-audio data. Run state machine 174 provides the appropriate control signals 191 to multiplexer 184 to provide a path between the register holding the first word of CD-audio data to high and low byte registers 186 and 188. The most significant byte of the first word of CD-audio data is loaded in high byte register 186 and the least significant byte of the first word of CD-audio data is loaded in low byte register 188 by run state machine 174.

Having loaded the first word of CD-audio data into high and low byte registers 186 and 188, ping or pong registers 180 or 182 having contained the first word is then loaded with the third word of data, the other register containing the second word. By way of example, if ping register 180 had initially contained the first word, pong register 182 would contain the second word. After the first word from ping register 180 has been loaded into high and low byte registers 186 and 188 a fifo_empty signal is generated within request state machine 170. Request state machine 170 then loads the third word into ping register 180. After high and low byte registers 186 and 188 have shifted out the first word of CD-audio data, run state machine 174 configures multiplexer 184 to create a data path between pong register 182 and the high and low byte registers 186 and 188 in order to shift out the second word of CD-audio data. The steps are repeated until the end of the CD-audio data is reached.

After high and low byte registers 186 and 188 have been loaded with the respective bytes of the first word of CD-audio data, run state machine 174 configures multiplexer 190 to initially create a data path from the high byte register 186 to D/A 111. The most significant byte of the CD-audio data is then shifted out of high byte register 186 a bit at a time, the most significant bit first. As soon as the most significant byte of the first word has been shifted out, run state machine 174 configures multiplexer 190 to create a data path from low byte register 188 to D/A 111. The least significant byte of the first word is shifted out of low byte register 188 one bit at a time, most significant bit first, to maintain continuity with the least significant bit of the most significant byte of the first word.

While the low byte register is being shifted, high byte register 186 is loaded with the most significant byte of the second word of CD-audio data. After the least significant byte of the first word has been shifted out of the low byte register 188, multiplexer 190 is switched back to high byte register 186 and the most significant byte of the second word starts to shift out to D/A 111. At that time, the least significant byte of the second word is shifted into low byte register 188. The process is repeated with the successive bytes of the remainder of the CD-audio.

The bits shifted out from high and low byte registers 186 and 188 through multiplexer 190 are synchronous with the audio and the left/right clocks generated by timing generator 165. D/A 111 receives the audio and left/right clocks with the CD-audio data and converts the CD-audio data into an analog waveform. The analog waveform can be amplified by amplifier 112 and sent to speaker 113.

As can be appreciated, the use of buffer memory 136 in a first-in-first-out (fifo) configuration allows the exemplary embodiment of the present invention to receive speed dependent data from the CD at a rate greater than the normal speed associated with the speed dependent data. The speed dependent data can then be buffered and parsed out from buffer memory 136 at an output rate typically associated with the speed dependent data. Buffer memory 136 can be any appropriate size necessary to adequately buffer the speed dependent data.

Ping and pong registers 180 and 182 further provide a buffer in order to provide continuous output. While the contents of one of ping and pong registers 180 and 182 is being shifted out, the other register is being loaded with the next word of data. Thus, ping and pong registers 180 and 182 provide a one word buffer.

High and low byte registers 186 and 188 also provide further buffering. While high byte register 186 is outputting its contents, the following byte is loaded into the low byte. And when the contents of the low byte register begins to shift out after the high byte register has finished shifted out its contents, the high byte register is then loaded with the next byte of data. Thus, an elastic buffer is contemplated with multiple layers of buffering at different levels. In one embodiment, three levels of buffering utilized at the word, byte and bit level.

Referring back to FIGS. 8 and 11, run state machine 174 may receive an under_run signal 175 from request state machine 170. Under_run signal 175 indicates that both ping and pong registers 180 and 182 have not been loaded with the next pieces of data. With the receipt of under_run signal 175 run state machine 174 transitions 258 to state 253. Also, multiplexer 190 is configured such that its output to the D/A is digital silence. In this manner, the output of the speaker is silence rather than any spurious noise.

In state 253, run state machine 174 waits until ping and pong registers 180 and 182 have been loaded by the request state machine 170. Since the under_run condition is a subset of a fifo_empty condition, request state machine 170 would be sending requests to buffer manager 132 for more CD-audio data. Since both ping and pong registers 180 and 182 are empty the fifo_empty signal would persist until both ping and pong registers are filled. Thus, successive requests are made by request state machine 170 for more data. After ping and pong registers 180 and 182 have been loaded, run state machine 174 transitions 254 to state 255 and loads high byte register 186 with the next byte of data.

In state 255, run state machine 174 waits for the appropriate edge of the left/right clock. By way of example, should the last word of CD-audio data outputted from the audio path have been a left channel word, the next word would be a right channel word. Thus, run state machine 174 must wait to synchronize with the correct edge of the left/right clock such that the next word is shifted out to the D/A as a right channel word. After the sequence of data has been synchronized, operations continue as before.

When the last word of CD-audio information has been shifted out to D/A 111, run state machine 174 receives a data end signal 181 from clock state machine 172. When data end signal 181 is received 259 run state machine 174 returns to idle state 250. Simultaneously, the audio clock and the left/right clocks of timing generator 165 are also stopped. Alternatively, run state machine can be disabled by the deactivation of enable signal 176 from control register 162. At that point run state machine 174 transitions 259 to idle state 250. However, as discussed previously, run and clock state machines 174 and 172 continue to operate until the last bit of the pending word has propagated out as according to word count 178.

The illustrated embodiments have focused on CDs and CD-audio information as the medium and speed dependent type of data, however the present invention can be utilized with any type of disc medium and speed dependent data format. By way of example, the present invention can be utilized to retrieve speed dependent disc based video data for output to a monitor, rather than CD-audio data played on a speaker. With the proliferation of data formats, including audio/visual formats such as CD-i, DVD, laser disc, photoCD and others, many of which are speed dependent, the need for a method and apparatus for spinning a disc memory medium at an optimal speed without slowing down is satisfied by the present invention.

Providing an elastic buffer having multiple layers of buffering provides the ability to read data at a fast rate and output it at a significantly slower rate. Further, mechanisms for reading the data from the disc memory medium at intervals rather than in a continuous stream further alleviates the need to slow down the spinning of the disc. In the previous detailed description, a method and apparatus for reading speed dependent data from a disc memory medium without the need to slow down the disc to the associated speed from an optimal speed is disclosed.

While this invention has been described in terms of several preferred embodiments, there are alterations, permutations, and equivalents which fall within the scope of this invention. For example, the apparatuses and methods of the present invention can be applied to all types of disc based memory mediums and drives. It should also be noted that there are alternative ways of implementing both the method and apparatus of the present invention. It is therefore intended that the following appended claims be interpreted as including all such alterations, permutations, and equivalents as fall within the true spirit and scope of the present invention.

What is claimed is:

1. A disc drive capable of spinning a disc, where the disc includes a first plurality of data associated with a first disc data format and a second plurality of data associated with a second disc data format, the disc drive comprising:

a drive mechanism capable of spinning the disc at a first speed associated with the first disc data format and at a second speed associated with the second disc data format, the second speed being faster than the first speed, wherein the drive mechanism is further capable of retrieving data from the disc; and an elastic buffer in communication with the drive mechanism, the elastic buffer being capable of receiving data from the drive mechanism at a variable input data rate and outputting data at a variable output data rate, such that when the drive mechanism spins the disc at the second speed the elastic buffer receives the first plurality of data without causing the drive mechanism to slow down to the first speed.

2. A disc drive as recited in claim 1, wherein the elastic buffer is configured to output the first plurality of data at the variable output data rate that is a first data rate associated with the first format.

3. A disc drive as recited in claim 1, the elastic buffer including:

a memory buffer; and a disc drive controller in communication with the drive mechanism and the memory buffer, the disc drive controller being capable of receiving the first plurality of data from the drive mechanism at the variable input data rate while the disc is spinning at the second speed, and storing the first plurality of data in the memory buffer such that the disc drive controller reads out the first plurality of data from the memory buffer at the variable output data rate, wherein the variable output data rate is the data rate associated with the first format.

4. A disc drive as recited in claim 3, the disc drive controller including:

a buffer manager in communication with the memory buffer, the buffer manager controlling the flow of communication to and from the memory buffer; and a disc interface in communication with the drive mechanism and the buffer manager, the disc interface allowing communication between the buffer manager and the drive mechanism.

5. A disc drive as recited in claim 4, the disc drive controller further including a host interface in communication with the buffer manager and a central processing unit, the host interface allowing communication between the buffer manager and the central processing unit, such that the host interface is capable of providing the central processing unit with data at the variable output data rate, including the first and second pluralities of data, when the central processing unit requests data from the compact disc, wherein the variable output data rate is a data rate associated with the central processing unit.

6. A disc drive as recited in claim 4, the disc drive controller further including an audio controller in communication with the buffer manager, the audio controller further buffering the flow of data from the memory buffer by way of the buffer manager, such that the data outputs to a speaker at the variable output data rate, wherein the variable output data rate is the data rate associated with the first format, and the speaker produces audible sound.

7. A disc drive as recited in claim 4, wherein the buffer manager is capable of arbitrating a plurality of requests for communication with the memory buffer from the disc interface, the host interface, and the audio controller, such that the buffer manager controls the variable input data rate of data being written into the memory buffer and the variable output data rate of data output from the memory buffer to the audio controller and the central processing unit.

8. A disc drive as recited in claim 1, the disc drive further comprising:

a digital to analog converter, the digital to analog converter receiving the first plurality of data from the elastic memory buffer in a digital form and converting the first plurality of data into an analog signal;

an amplifier, the amplifier receiving and amplifying the analog signal to produce an amplified analog signal; and a speaker for receiving the amplified analog signal, whereby the speaker produces audible sound.

9. A disc drive as recited in claim 1, wherein the first disc data format is an audio compact disc data format.

10. A disc drive as recited in claim 1, wherein the second disc data format is a compact disc read-only-format.

11. A computer including a disc drive as recited in claim 1.

12. The disc drive as recited in claim 1 wherein the disc is an optical disc.

13. The disc drive as recited in claim 12 wherein the optical disc is a compact disc.

14. A disc drive capable of spinning a disc, wherein the disc includes a first plurality of data associated with a first disc data format and a second plurality of data associated with a second disc data format, the disc drive, comprising:

a drive mechanism capable of spinning the disc at a first speed associated with the first data format and a second speed associated with the second disc data format, the second speed being faster than the first speed, wherein the drive mechanism is further capable of retrieving data from the disc; and an audio controller, the audio controller including,
        an audio control state machine,
        a timing generator, the timing generator generating a plurality of clocks for use by a digital to analog converter for converting the first plurality of data from a digital form to an analog signal, an elastic audio path in communication with the drive mechanism and the audio state control machine, the elastic audio path receiving the first plurality of data from the drive mechanism, and a control register in communication with a central processing unit, the audio control state machine, the timing generator, and the elastic audio path, the control register receiving an enable signal from the central processing unit for enabling the audio control state machine, the timing generator, and the elastic audio path, the audio control state machine controlling the timing generator and the elastic audio path.

15. A disc drive as recited in claim 14, wherein the audio control state machine controls the timing generator and the elastic audio path, such that when the first plurality of data is received by the elastic audio path at a rate slower than the data rate associated with the first format the output of the elastic data path is digital audio silence, such that the speaker produces no audible sound.

16. A disc drive as recited in claim 15, wherein the audio control state machine controls the timing generator and the elastic audio path, such that when the reception of the first plurality of data by the elastic audio path is interrupted, creating an interruption and leaving a remainder of the first plurality of data in a memory buffer, the output of the elastic data path is digital silence, the speaker producing no audible sound, and the output of the elastic audio path after the interruption is the remainder of the first plurality of data.

17. A disc drive as recited in claim 16, the elastic audio path including:

a ping and a pong memory buffers, the ping and pong memory buffers receiving the first plurality of data from the memory buffer by way of the buffer manager such that the first plurality of data is loaded into the ping and pong memory buffers a word at a time, the ping memory buffer outputting a first word of the first plurality of data while the pong memory buffer is receiving a second word of the first plurality of data, then the pong memory buffer outputting the second word of the first plurality of data while the ping memory buffer receives a third word of the first plurality of data, and repeating until the first plurality of data has passed through the ping and pong memory buffers.

18. A disc drive as recited in claim 17, the elastic audio path including:

a high byte and a low byte memory buffers, the high byte and low byte memory buffers receiving the first plurality of data from the ping and pong buffers a byte at a time, such that the high byte memory buffer is outputting a high byte of the first word of the first plurality of data while the low byte memory buffer is receiving a low byte of a second word of the first plurality of data, then the low byte memory buffer outputting the low byte of the second word while the high byte memory buffer is receiving a high byte of the second word, and repeating until the first plurality of data has passed through the high byte and low byte memory buffers.

19. A disc drive capable of spinning a disc, wherein the disc includes a first plurality of data associated with a first disc data format and a second plurality of data associated with a second disc data format, the disc drive comprising:

a drive mechanism capable of spinning the disc at a first speed associated with the first disc data format and a second speed associated with the second disc data format, the second speed being faster than the first speed, and the drive mechanism further capable of retrieving data from the disc; and an elastic buffer in communication with the drive mechanism, the elastic buffer having a first, a second and a third layer of elasticity, the elastic buffer capable of receiving data from the drive mechanism at a variable input data rate and outputting data at a variable output data rate, such that when the drive mechanism spins the disc at the second speed the elastic buffer receives the first plurality of data without causing the drive mechanism to slow down to the first speed, and the elastic buffer outputs the first plurality of data at the variable output data rate.

20. A disc drive as recited in claim 19, wherein the variable output data rate is a data rate associated with the first format.

21. A disc drive as recited in claim 19, wherein the first layer of elasticity comprises a memory buffer and a disc controller, the disc controller receiving and writing to the memory buffer a first plurality of data from the disc by way of the drive mechanism at the variable input data rate, and reading the first plurality of data from the memory buffer and outputting at the variable output data rate.

22. A disc drive as recited in claim 19, wherein the second layer of elasticity comprises a ping and a pong memory buffers, such that the first plurality of data is loaded into the ping and pong memory buffers a word at a time, the ping memory buffer outputting a first word of the first plurality of data while the pong memory buffer is receiving a second word of the first plurality of data, then the pong memory buffer outputting the second word of the first plurality of data while the ping memory buffer receives a third word of the first plurality of data, and repeating until the first plurality of data has passed through the ping and pong memory buffers.

23. A disc drive as recited in claim 19, wherein the third layer of elasticity is a high byte and a low byte memory buffers, such that the first plurality of data is loaded into the high byte and the low byte memory buffers a byte at a time, the high byte memory buffer is outputting a high byte of the first word of the first plurality of data while the low byte memory buffer is receiving a low byte of a second word of the first plurality of data, then the low byte memory buffer outputting the low byte of the second word while the high byte memory buffer is receiving a high byte of the second word, and repeating until the first plurality of data has passed through the high byte and low byte memory buffers.

24. A method of retrieving data from a disc comprising:

providing a disc drive capable of spinning a disc including a first plurality of data associated with a first disc data format and a second plurality of data associated with a second disc data format, the first format associated with spinning the disc at a first speed, and the second format associated with spinning the disc at a second speed, the second sped being faster than the first speed;

spinning the disc at the second speed;

requesting the first plurality of data from the disc drive;

reading the first plurality of data while the disc is spinning at the second speed into an elastic buffer; and buffering the first plurality of data in the elastic buffer, such that the first plurality of data is output at a first data rate associated with the first format while maintaining the disc spinning at the second speed.

25. A method of retrieving data from a disc comprising:

providing a disc drive capable of spinning a disc including a first plurality of data associated with a first disc data format and a second plurality of data associated with a second disc data format, the first format associated with spinning the disc at a first speed, and the second format associated within spinning the disc at a second speed, the second speed being faster than the first speed;

spinning the disc at the second speed with a disc drive mechanism;

receiving a request from a central processing unit to output the first plurality of data to a speaker;

reading the first plurality of data from the disc by way of the disc drive mechanism while the disc is spinning at the second speed; and buffering the first plurality of data in an elastic buffer by way of a disc drive controller, the elastic buffer including a memory buffer, a ping and a pong memory buffers, and a high and a low byte memory buffers.

26. The method recited in claim 25, wherein the step of buffering the first plurality of data in the elastic buffer includes buffering the first plurality of data into the memory buffer by way of the disc drive controller, wherein the sequence of the first plurality of data read out of the memory buffer at an output data rate is the same sequence as the sequence of first plurality of data written into the memory buffer at an input data rate, the input data rate capable of being greater than the output data rate.

27. The method recited in claim 25, wherein the step of buffering the first plurality of data in the elastic buffer includes buffering the first plurality of data from the memory buffer to the ping and pong memory buffers by way of the disc drive controller, wherein the first plurality of data is alternating written into and read out of the ping and pong memory buffers one word of the first plurality of data at a time, such that when the ping memory buffer is outputting a first word of the first plurality of data the pong memory buffer is receiving a second word of the first plurality of data, and when the pong memory buffer is outputting the second word of the first plurality of data the ping memory buffer is receiving a third word of the first plurality of data, and repeating until the first plurality of data has been passed through the ping and pong memory buffers.

28. The method recited in claim 25, wherein the step of buffering the first plurality of data in the elastic buffer includes buffering the first plurality of data from the ping and pong memory buffers to the high and low byte memory buffers, wherein the first plurality of data is alternating written into and read out of the ping and pong memory buffers one byte of the first plurality at a time such that when the high byte memory buffer is outputting a high byte of the first word of the first plurality of data the low byte memory buffer is receiving a low byte of the second word of the first plurality of data, and when the low byte memory buffer is outputting the low byte of the second word, the high byte memory buffer is receiving a high byte of the third word of the first plurality of data, and repeating until the first plurality of data has been passed through the high byte and low byte memory buffers.

29. The method recited in claim 25 further comprising outputting the first plurality of data to the speaker such that audible sound is produced.

30. A disc drive capable of reading data from a disc including a first plurality of data formatted to be read at a first data rate and a second plurality of data formatted to be read at a second data rate, the disc drive comprising:

a drive mechanism capable of spinning the disc at a first speed associated with the first data rate and of retrieving data from the disc; and an elastic buffer in communication with the drive mechanism and capable of receiving data from the drive mechanism at the first data rate and outputting the data at either the first or the second data rate, such that both the first and second plurality of data can be retrieved from the disc at the first data rate.

31. The disc drive of claim 30 wherein the drive mechanism is capable of spinning the disc at both the first speed associated with the first data rate and a second speed associated with the second data rate, and wherein the first speed is faster than the second speed.

32. The disc drive of claim 30 further comprising:

a memory buffer; and a disc drive controller in communication with the drive mechanism and the memory buffer, capable of receiving data from the drive mechanism at the first data rate, storing the data in the memory buffer, and outputting the data at the second data rate.

33. The disc drive of claim 30 wherein the disc is an optical disc.

34. The disc drive of claim 30 wherein the disc is a compact disc.

35. A method of retrieving data from a disc, the data including a first plurality of data formatted to be read from the disc at a first data rate and a second plurality of data formatted to be read from the disc at a non-unity multiple of the first data rate, the method comprising:

reading both the first plurality of data and the second plurality of data at the non-unity multiple of the first speed;

storing the first plurality of data in an elastic buffer; and buffering the first plurality of data in the elastic buffer, such that the first plurality of data is output from the elastic buffer at the first data rate.

36. A method of retrieving data from a disc, the data including a first plurality of data in a first format and a second plurality of data in a second format, comprising:

reading the first plurality of data from a disc at a first data rate associated with the first format;

storing the first plurality of data in a memory buffer at the first data rate;

outputting the first plurality of data from the memory buffer at the first data rate;

reading the second plurality of data from the disc at the first data rate;

storing the second plurality of data into an elastic buffer at the first data rate; and outputting the second plurality of data from the elastic buffer at a second data rate associated with the second format.

37. The method of claim 36 wherein the step of storing the first plurality of data and the step of storing the second plurality of data use common memory elements.

38. The method of claim 36 wherein the steps of reading the first and second plurality of data comprise reading the data from an optical disc.

39. The method of claim 36 wherein the second format is an audio data format.

40. The method of claim 36 further comprising:

outputting the first plurality of data from the memory buffer to a first processing path; and outputting the second plurality of data from the memory buffer to a second processing path.

41. The method of claim 40 wherein the step of outputting the second plurality of data from the memory buffer to a second processing path includes converting the second plurality of data from a digital to an analog signal.

* * * * *